3,364,262
POLYHYDROXYALKYLPOLYAMINES
Henryk A. Cyba, Evanston, Ill., assignor to Universal Oil Products Company, Des Plaines, Ill., a corporation of Delaware
No Drawing. Continuation-in-part of application Ser. No. 329,281, Dec. 9, 1963. This application Nov. 25, 1966, Ser. No. 596,772
10 Claims. (Cl. 260—563)

This is a continuation-in-part of application Ser. No. 329,281, filed Dec. 9, 1963, now abandoned, which in turn is a continuation-in-part of application Ser. No. 290,917, filed June 27, 1963, now U.S. Patent No. 3,288,748, and relates to a novel composition of matter composed of the elements of carbon, hydrogen, nitrogen and oxygen in a specific chemical configuration.

The novel composition of matter is illustrated by the following formula

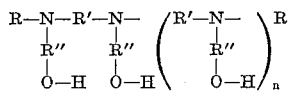

where R is a sec-alkyl group of from 6 to about 50 carbon atoms or a cycloalkyl group, R' is an alkylene group of from 2 to about 6 carbon atoms, R'' is an alkylene group of from 2 to about 6 carbon atoms and $n$ is an integer of from 0 to 4.

From the above formula, it will be seen that it is essential that each nitrogen atom contains a hydroxyalkyl group attached thereto and that the terminal nitrogen atoms each contain a sec-alkyl radical of from 6 to about 50 carbon atoms or a cycloalkyl radical attched thereto. This specific chemical configuration is essentil in the novel compounds of the present invention and, as will be shown by the examples of the present specifications, such compounds possess unexpected superior properties.

The novel compounds of the present invention differ from those in the prior art in both the chemical configuration and the method of preparation. As hereinbefore set forth, the compounds of the present invention contain one and only one hydroxyalkyl group attached to each nitrogen atom. In the compounds of the prior art, two hydroxyalkyl groups are attached to at least one nitrogen atom and, in some cases, to all nitrogen atoms present in the compound. In another important difference, the compounds of the present invention are prepared in the final step from alkylene polyamines containing only secondary nitrogen atoms and not, as in the case of the compounds of the prior art, from compounds containing primary nitrogen atoms. Accordingly, it will be seen that the compounds of the present invention differ both in chemical configuration and by method of preparation from the compounds of the prior art.

As will be illustrated by the examples appended by the present specifications, it is an essential requirement that the novel compounds of the present invention contain sec-alkyl groups having from 6 to about 50 carbon or cycloalkyl groups. When used, for example, in the stabilization of polypropylene, which is a more difficult polyolefin to stabilize, the compounds having the limitations set forth above show unexpectedly superior properties as compared to related derivatives containing sec-alkyl groups of a lesser number of carbon atoms or related derivative in which the alkyl groups are of normal alkyl configuration.

Referring to the formula hereinbefore set forth, when $n$ is zero the compound is an N,N'-di-sec-alkyl-N-hydroxyalkyl-aminoalkylalkanolamine, which also may be named N,N'-di-sec-alkyl-N,N'-hydroxyalkyl-alkylenediamine or the corresponding dicycloalkyl derivatives. As hereinbefore set forth, the alkyl groups must be of secondary configuration and must contain from 6 to about 50 carbon atoms and preferably from 6 to about 20 carbon atoms each. Illustrative preferred compounds in this embodiment include N,N'-di-sec-hexyl-N-(2-hydroxyethyl)-aminoethyl-ethanolamine,
N,N'-di-sec-heptyl-N-(2-hydroxyethyl)-aminoethyl-ethanolamine,
N,N'-di-sec-octyl-N-(2-hydroxyethyl)-aminoethyl-ethanolamine,
N,N'-di-sec-nonyl-N-(2-hydroxyethyl)-aminoethyl-ethanolamine,
N,N'-di-sec-decyl-N-(2-hydroxyethyl)-aminoethyl-ethanolamine,
N,N'-di-sec-undecyl-N-(2-hydroxyethyl)-aminoethyl-ethanolamine,
N,N'-di-sec-dodecyl-N-(2-hydroxyethyl)-aminoethyl-ethanolamine,
N,N'-di-sec-tridecyl-N-(2-hydroxyethyl)-aminoethyl-ethanolamine,
N,N'-di-sec-tetradecyl-N-(2-hydroxyethyl)-aminoethyl-ethanolamine,
N,N'-di-sec.pentadecyl-N-(2-hydroxyethyl)-aminoethyl-ethanolamine,
N,N'-di-sec-hexadecyl-N-(2-hydroxyethyl)-aminoethyl-ethanolamine,
N,N'-di-sec-heptadecyl-N-(2-hydroxyethyl)-aminoethyl-ethanolamine,
N,N'-di-sec-octadecyl-N-(2-hydroxyethyl)-aminoethyl-ethanolamine,
N,N'-di-sec-nonadecyl-N-(2-hydroxyethyl)-aminoethyl-ethanolamine,
N,N'-di-sec-eicosyl-N-(2-hydroxyethyl)-aminoethyl-ethanolamine, etc.

The above compounds are illustrative of compounds in which R' and R'' each contain two carbon atoms. It is understood that corresponding compounds are included in which one or both of the groups containing two carbon atoms are replaced by a group containing 3, 4, 5 or 6 carbon atoms.

Referring again to the above formula, when $n$ is 1, the compounds of the present invention are named N,N'-bis-[N - sec - alkyl-N-(hydroxyalkyl)-aminoalkyl]-alkanolamine, which also can be named $N^1,N^3$-di-sec-alkyl-$N^1$,$N^2,N^3$-tri-(hydroxyalkyl)-dialkylenetriamine, where each sec-alkyl contains from 6 to about 50 carbon atoms, or the corresponding cycloalkyl derivatives. Here again, it will be noted that each terminal nitrogen contains a sec-alkyl group of 6 to 50 carbon atoms each and each nitrogen atom contains a hydroxyalkyl group attached thereto. Illustrative preferred compounds in this embodiment include N,N-bis-[N-sec-hexyl-N-(2-hydroxyethyl)-aminoethyl]-ethanolamine,
N,N-bis-[N-sec-heptyl-N-(2-hydroxyethyl)aminoethyl]-ethanolamine,
N,N-bis-[N-sec-octyl-N-(2-hydroxyethyl)-aminoethyl]-ethanolamine,
N,N-bis-[N-sec-nonyl-N-(2-hydroxyethyl)-aminoethyl]-ethanolamine,
N,N-bis-[N-sec-decyl-N-(2-hydroxyethyl)-aminoethyl]-ethanolamine,
N,N-bis-[N-sec-undecyl-N-(2-hydroxyethyl)-aminoethyl]-ethanolamine,
N,N-bis-[N-sec-dodecyl-N-(2-hydroxyethyl)-aminoethyl]-ethanolamine,
N,N-bis-[N-sec-tridecyl-N-(2-hydroxyethyl)-aminoethyl]-ethanolamine,
N,N-bis-[N-sec-tetradecyl-N-(2-hydroxyethyl)-aminoethyl]-ethanolamine, N,N-bis-[N-sec-pentadecyl-N-(2-hydroxyethyl)-amino-ethyl]-ethanolamine,
N,N-bis[N-sec-hexadecyl-N-(2-hydroxyethyl)-amino-ethyl]-ethanolamine,
N,N-bis-[N-sec-heptadecyl-N-(2-hydroxyethyl)-amino-ethyl]-ethanolamine,
N,N-bis-[N-sec-octadecyl-N-(2-hydroxyethyl)-amino-ethyl]-ethanolamine,
N,N-bis-[N-sec-nonadecyl-N-(2-hydroxyethyl)amino-ethyl]-ethanolamine,
N,N-bis-[N-sec-eicosyl-N-(2-hydroxyethyl)-amino-ethyl]-ethanolamine, etc.

Here again, one or both of the groups containing two carbon atoms may be replaced by a group containing 3, 4, 5 or 6 carbon atoms.

When $n$ is 2, the compound is an $N^1,N^4$-di-sec-alkyl-$N^1,N^2,N^3,N^4$-tetra-(hydroxyalkyl)-trialkylenetetramine in which each sec-alkyl contains from 6 to 50 carbon atoms or the corresponding dicycloalkyl derivatives. Illustrative compounds in this embodiment include $N^1,N^4$-di-sec-hexyl-$N^1,N^2,N^3,N^4$-tetra-(2-hydroxyethyl)-triethylenetetramine,
$N^1,N^4$-di-sec-heptyl-$N^1,N^2,N^3,N^4$-tetra-(2-(hydroxyethyl)-triethylenetetramine,
$N^1,N^4$-di-sec-octyl-$N^1,N^2,N^3,N^4$-tetra-(2-hydroxyethyl)-triethylenetetramine,
$N^1,N^4$-disec-nonyl-$N^1,N^2,N^3,N^4$-tetra-(2-hydroxyethyl)-triethylenetetramine,
$N^1,N^4$-di-sec-decyl-$N^1,N^2,N^3,N^4$-tetra-(2-hydroxyethyl)-triethylenetetramine,
$N^1,N^4$-di-sec-undecyl-$N^1,N^2,N^3,N^4$-tetra-(2-hydroxyethyl)-triethylenetetramine,
$N^1,N^4$-di-secdodecyl-$N^1,N^2,N^3,N^4$-tetra-(2-hydroxyethyl)-triethylenetetramine,
$N^1,N^4$-di-sec-tridecyl-$N^1,N^2,N^3,N^4$-tetra-(2-hydroxyethyl)-triethylenetetramine,
$N^1,N^4$-di-sec-tetradecyl-$N^1,N^2,N^3,N^4$-tetra-(2-hydroxyethyl)-triethylenetetramine,
$N^1,N^4$-di-sec-pentadecyl-$N^1,N^2,N^3,N^4$-tetra-(2-hydroxyethyl)-triethylenetetramine,
$N^1,N^4$-di-sec-hexadecyl-$N^1,N^2,N^3,N^4$-tetra-(2-hydroxyethyl)-triethylenetetramine,
$N^1,N^4$-di-sec-heptadecyl-$N^1,N^2,N^3,N^4$-tetra-(2-hydroxyethyl)-triethylenetetramine,
$N^1,N^4$-di-sec-octadecyl-$N^1,N^2,N^3,N^4$-tetra-(2-hydroxyethyl)-triethylenetetramine,
$N^1,N^4$-di-sec-nonadecyl-$N^1,N^2,N^3,N^4$-tetra-(2-hydroxyethyl)-triethylenetetramine,
$N^1,N^4$-di-sec-eicosyl-$N^1,N^2,N^3,N^4$-tetra-(2-hydroxyethyl)-triethylenetetramine, etc. Here again, it is understood that one or both of the groups containing two carbon atoms may be replaced by a group containing 3, 4, 5 or 6 carbon atoms.

Referring again to the above formula, when $n$ is 3, the compound will be $N^1,N^5$-di-sec-alkyl-$N^1,N^2,N^3N^4,N^5$-penta-(hydroxyalkyl)-tetra-alkylenepentamine containing 6 to 50 carbon atoms in each sec-alkyl or the corresponding dicycloalkyl derivatives. Illustrative preferred compounds in this embodiment include $N^1,N^5$-di-sec-hexyl-$N^1,N^2,N^3,N^4,N^5$-penta-(2-hydroxyethyl)-tetraethylenepentamine,
$N^1,N^5$-di-sec-heptyl-$N^1,N^2,N^3,N^4,N^5$-penta-(2-hydroxyethyl)-tetraethylenepentamine,
$N^1,N^5$-di-octyl-$N^1,N^2,N^3,N^4,N^5$-penta-(2-hydroxyethyl)-tetraethylenepentamine,
$N^1,N^5$-di-sec-nonyl-$N^1,N^2,N^3,N^4,N^5$-penta-(2-hydroxyethyl)-tetraethylenepentamine,
$N^1,N^5$-di-sec-decyl-$N^1,N^2,N^3,N^4,N^5$-penta-(2-hydroxyethyl)-tetraethylenepentamine,
$N^1,N^5$-di-sec-undecyl-$N^1,N^2,N^3,N^4,N^5$-penta-(2-hydroxyethyl)-tetraethylenepentamine,
$N^1,N^5$-di-sec-dodecyl-$N^1,N^2,N^3,N^4,N^5$-penta-(2-hydroxyethyl)-tetraethylenepentamine,
$N^1,N^5$-di-sec-tridecyl-$N^1,N^2,N^3,N^4,N^5$-penta-(2-hydroxyethyl)-tetraethylenepentamine,
$N^1,N^5$-di-sec-tetradecyl-$N^1,N^2,N^3,N^4,N^5$-penta-(2-hydroxyethyl)-tetraethylenepentamine,
$N^1,N^5$-di-sec-pentadecyl-$N^1,N^2,N^3,N^4,N^5$-penta-(2-hydroxyethyl)-tetraethylenepentamine,
$N^1,N^5$-di-sec-hexadecyl-$N^1,N^2,N^3,N^4,N^5$-penta-(2-hydroxyethyl)-tetraethylenepentamine,
$N^1,N^5$-di-sec-heptadecyl-$N^1,N^2,N^3,N^4,N^5$-penta-(2-hydroxyethyl)-tetraethylenepentamine,
$N^1,N^5$-di-sec-octadecyl-$N^1,N^2,N^3,N^4,N^5$-penta-(2-hydroxyethyl)-tetraethylenepentamine,
$N^1,N^5$-di-sec-nonadecyl-$N^1,N^2,N^3,N^4,N^5$-penta-(2-hydroxyethyl)-tetraethylenepentamine,
$N^1,N^5$-di-sec-eicosyldecyl-$N^1,N^2,N^3,N^4,N^5$-penta-(2-hydroxyethyl)-tetraethylenepentamine, etc.

Here again, it is understood that one or both of the groups containing two carbon atoms may be replaced by a group containing 3, 4, 5 or 6 carbon atoms.

Referring again to the above formula, when $n$ is 4, the compound will be $N^1,N^6$-di-sec-alkyl-$N^1,N^2,N^3,N^4,N^5,N^6$-hexa-(hydroxyalkyl-pentaethylenehexamine containing 6 to 50 carbon atoms in each sec-alkyl or the corresponding dicycloalkyl derivatives. Illustrative preferred compounds in this embodiment include $N^1,N^6$-di-sec-hexyl-$N^1,N^2,N^3,N^4,N^5,N^6$-hexa-(2-hydroxyethyl)-pentaethylenehexamine,
$N^1,N^6$-di-sec-heptyl-$N^1,N^2,N^3,N^4,N^5,N^6$-hexa-(2-hydroxyethyl)-pentaethylenehexamine,
$N^1,N^6$-di-sec-octyl-$N^1,N^2,N^3,N^4,N^5,N^6$-hexa-(2-hydroxyethyl)-pentaethylenehexamine,
$N^1,N^6$-di-sec-nonyl-$N^1,N^2,N^3,N^4,N^5,N^6$-hexa-(2-hydroxyethyl)-pentaethylenehexamine,
$N^1,N^6$-di-sec-decyl-$N^1,N^2,N^3,N^4,N^5,N^6$-hexa-(2-hydroxyethyl)-pentaethylenehexamine,
$N^1,N^6$-di-sec-undecyl-$N^1,N^2,N^3,N^4,N^5,N^6$-hexa-(2-hydroxyethyl)-pentaethylenehexamine,
$N^1,N^6$-di-sec-dodecyl-$N^1,N^2,N^3,N^4,N^5,N^6$-hexa-(2-hydroxyethyl)-pentaethylenehexamine,
$N^1,N^6$-di-sec-tridecyl-$N^1,N^2,N^3,N^4,N^5,N^6$-hexa-(2-hydroxyethyl)-pentaethylenehexamine,
$N^1,N^6$-di-sec-tetradecyl-$N^1,N^2,N^3,N^4,N^5,N^6$-hexa-(2-hydroxyethyl)-pentaethylenehexamine,
$N^1,N^6$-di-sec-pentadecyl-$N^1,N^2,N^3,N^4,N^5,N^6$-hexa-(2-hydroxyethyl)-pentaethylenehexamine,
$N^1,N^6$-di-sec-hexadecyl-$N^1,N^2,N^3,N^4,N^5,N^6$-hexa-(2-hydroxyethyl)-pentaethylenehexamine,
$N^1,N^6$-di-sec-heptadecyl-$N^1,N^2,N^3,N^4,N^5,6^6$-hexa-(2-hydroxyethyl)-pentaethylenehexamine,
$N^1,N^6$-di-sec-octadecyl-$N^1,N^2,N^3,N^4,N^6$-hexa-(2-hydroxyethyl)-pentaethylenehexamine,
$N^1,N^6$-di-sec-nonadecyl-$N^1,N^2,N^3,N^4,N^5,N^6$-hexa-(2-hydroxyethyl)-pentaethylenehexamine,
$N^1,N^6$-di-sec-eicosyl-$N^1,N^2,N^3,N^4,N^5,N^6$-hexa-(2-hydroxyethyl)-pentaethylenehexamine, etc.

Here again, it is understood that one or both of the groups containing two carbon atoms may be replaced by a group containing 3, 4, 5 or 6 carbon atoms.

As hereinbefore set forth the alkyl groups attached to the terminal nitrogen atoms are secondary alkyl groups containing from 6 to about 50 carbon atoms each. In another embodiment these groups may be cycloalkyl groups and particularly cyclohexyl, alkylcyclohexyl, dialkylcyclohexyl, etc., although they may comprise cyclobutyl, cyclopentyl, cycloheptyl, cyclooctyl, etc., and alklyated derivatives thereof. The cycloalkyl groups may be considered as corresponding to secondary alkyl groups.

As hereinbefore set forth, another important difference of the compounds of the present invention from those of the prior art is in their method of preparation. In accordance with the present invention, the compounds are prepared by first reductively alkylating an alkylenepolyamine with a ketone containing 6 to 50 carbon atoms and then subjecting the resultant alkylenepolyamine containing sec-alkyl groups attached to the terminal nitrogen atoms to oxyalkylenation. Accordingly, the oxyalkylenation is performed on alkylenepolyamines containing only secondary nitrogen atoms. There are no primary nitrogen atoms available and, therefore, will not result in the formation of a nitrogen atom containing two hydroxyalkyl groups. As hereinbefore set forth, it is an essential requirement that the compounds of the present invention comprise those in which the terminal nitrogen atoms each contain a sec-alkyl group of 6 to 50 carbon atoms attached thereto and each of the nitrogen atoms contain one and only hydroxyalkyl group attached thereto.

As hereinbefore set forth, the compounds of the present invention are prepared by first subjecting an alkylenepolyamine to reductive alkylation. The alkylenepolyamines include ethylenediamine, diethylenetriamine, triethylenetetramine, tetraethylenepentamine, pentaethylenehexamine and corresponding alkylene polyamines in which the ethylene group or groups are replaced by propylene, butylene, pentylene and/or hexylene groups. These compounds are prepared by using a ketone in the reductive alkylation. Any suitable ketone containing 6 to 50 carbon atoms may be used and will be selected to produce the desired secondary alkyl groups to be attached to the terminal nitrogen atoms. Illustrative preferred ketones include methyl butyl ketone, methyl pentyl ketone, methyl hexyl ketone, methyl heptyl ketone, methyl octyl ketone, methyl nonyl ketone, methyl decyl ketone, methyl undecyl ketone, methyl dodecyl ketone, methyl tridecyl ketone, methyl tetradecyl ketone, methyl pentadecyl ketone, methyl hexadecyl ketone, methyl heptadecyl ketone, methyl octadency ketone, etc. ethyl propyl ketone, ethyl butyl ketone, ethyl pentyl ketone, ethyl hexyl ketone, ethyl heptyl ketone, ethyl octyl ketone, ethyl nonyl ketone, ethyl decyl ketone, ethyl undecyl ketone, ethyl dodecyl ketone, ethyl tridecyl ketone, ethyl tetradecyl ketone, ethyl pentadecyl ketone, ethyl hexadecyl ketone, ethyl heptadecyl ketone, etc., dipropyl ketone, propyl butyl ketone, propyl pentyl ketone, propyl hexyl ketone, propyl heptyl ketone, propyl octyl ketone, propyl nonyl ketone, propyl decyl ketone, propyl undecyl ketone, propyl dodecyl ketone, propyl tridecyl ketone, propyl tetradecyl ketone, propyl pentadecyl ketone, propyl hexadecyl ketone, etc., dibutyl ketone, butyl pentyl ketone, butyl hexyl ketone, butyl heptyl ketone, butyl octyl ketone, butyl nonyl ketone, butyl decyl ketone, butyl undecyl ketone, butyl dodecyl ketone, butyl tridecyl ketone, butyl tetradecyl ketone, butyl pentadecyl ketone, etc., dipentyl ketone, pentyl hexyl ketone, pentyl heptyl ketone, pentyl octyl ketone, pentyl nonyl ketone, pentyl decyl ketone, pentyl undecyl ketone, pentyl dodecyl ketone, pentyl tridecyl ketone, pentyl tetradecyl ketone, etc., dihexyl ketone, hexyl heptyl ketone, hexyl octyl ketone, hexyl nonyl ketone, hexyl decyl ketone, hexyl undecyl ketone, hexyl dodecyl ketone, hexyl tridecyl ketone, etc., diheptyl ketone, heptyl octyl ketone, heptyl nonyl ketone, heptyl decyl ketone, heptyl undecyl ketone, heptyl dodecyl ketone, etc., dioctyl ketone, octyl nonyl ketone, octyl decyl ketone, octyl undecyl ketone, etc., dinonyl ketone, nonyl decyl ketone, didecyl ketone, etc. It is understood that the ketones may be of straight or branched chain configuration. Ketones are available commercially or they may be synthesized as required. A number of ketones and particularly the higher boiling ketones are available as mixtures which are either products or by-products of commercial operations. These mixtures generally are available at comparatively low cost and, as another advantage of the present invention, the mixtures may be used without the added time and expense of separating specific compounds in pure state.

One such mixture available commercially is "Stearone" which is diheptadecyl ketone.

When the dicycloalkyl derivatives are to be prepared, the cycloalkyl ketone is used in the reductive alkylation. In a particularly preferred embodiment, the cycloalkyl derivative is cyclohexyl, in which case cyclohexanone is used as the ketone. Other cycloalkyl ketones include cyclobutanone, cyclopentanone, cycloheptanone, cyclooctanone, etc. It is understood that the cycloalkyl ketone may contain alkyl groups attached to the cycloalkyl ring.

The reductive alkylation of the ketone and alkylenepolyamine is effected in any suitable manner. The reaction is effected using at least two moles of ketone per mole of alkylenepolyamine and generally an excess of the ketone, which may range up to about twenty mole proportion of ketone per one mole proportion of alkylenepolyamine, is employed to insure complete reaction. In one embodiment the reaction is effected in the presence of hydrogen and a suitable alkylation catalyst in one step, which may be either continuous or batch type operation. Any suitable reductive alkylation catalyst is employed including those containing nickel, platinum, palladium, etc., preferably composited with a suitable support. A particularly preferred catalyst comprises a composite of platinum and alumina, which may or may not contain combined halogen. The platinum generally is present in the catalyst in a concentration of from about 0.1 to about 2% by weight of the final catalyst and the halogen, when present, is in a concentration of total halogen of from about 0.01% to about 1% by weight of the final catalyst, the halogen preferably comprising fluorine and/or chlorine. Another suitable catalyst comprises an intimate mixture of copper oxide, chromium oxide and barium oxide. When using the platinum catalyst, the temperature generally will be within the range of from about 200° to about 500° F. and a hydrogen pressure of from about 100 to about 3000 pounds per square inch or more.

In a continuous type operation, the catalyst is disposed as a fixed bed in a reaction zone and the alkylenepolyamine, ketone and hydrogen, at the required temperature and pressure, are passed through the catalyst in either upward or downward flow. The reactor effluent is separated into a hydrogen stream and unreacted products, all or part of which may be recycled to the reaction zone, and the desired terminally alkylated alkylenepolyamine is separated from other high boiling products, if any. In a batch type operation, the alkylenepolyamine, ketone and catalyst are disposed in a reaction zone which is pressured with hydrogen and then heated to the desired temperature. After cooling, the products are separated to recover the desired terminally alkylated alkylenepolyamine. While the one-step process generally is preferred, it is understood that the reaction may be effected in two steps. In the first step, effected in the absence of hydrogen, the Schiff's base is first prepared and then is hydrogenated in a separate step to form the desired terminally alkylated alkylenepolyamine.

The terminally sec-alkylated or cycloalkylated alkylenepolyamine, prepared in the above manner, then is subjected to oxyalkylenation.. The oxyalkylenation is readily effected by charging the terminally sec-alkylated or cycloalkylated alkylenepolyamine into a reaction zone and passing alkylene oxide, particularly ethylene oxide, into contact with the alkylenepolyamine. The alkylene oxide will be used in a proportion of at least one mole thereof per each nitrogen atom in the alkylene polyamine. For example, when N,N'-di-sec-alkyl-ethylenediamine is to be oxyalkylenated, at least two moles of alkylene oxide are used per mole of ethylenediamine. Usually an excess of the alkylene oxide is employed in order to insure complete reaction. This reaction readily occurs at a low temperature which may range froms room temperature to 300° F. in the abence of a catalyst. As hereinbefore set forth, ethylene oxide is preferred. Other alkylene oxides include propylene oxide, butylene oxide, pentylene oxide, hexylesne oxide, etc. a well as styrene oxide, epichlorohydrin, etc. It is understood that the R″ alkylene group may be substituted by such groups as phenyl, alkoxy, thiooxy, halo, hydroxy, etc. It will be noted that the sec-alkylated or cycloalkylated alkylenepolyamine contains only secondary nitrogen atoms and accordingly the oxyalkylenation will result in each nitrogen atom containing only one oxyalkylene group.

From the above description, it will be seen that the novel compounds of the present invention are of specific chemical configuration, in which the terminal nitrogen atoms are each substituted with a sec-alkyl group of from 6 to about 50 carbon atoms or cycloalkyl group and each nitrogen atom is substituted with a hydroxyalkyl group. It also will be observed that these compounds are prepared by the oxyalkylenation of alkylenepolyamine containing only secondary nitrogen atoms.

The novel compounds of the present invention possess varied utility. They are of exceptional utility in substrates exposed to weather and in this embodiment the compounds of the present invention serve as weathering stabilizers. Although the mechanism in which these compounds function is not completely understood, these compounds serve to protect substrates which undergo ultraviolet light induced oxidation. It is believed that the compounds of the present invention preferentially become oxidized during such ultraviolet exposure and form an oxidized derivative. The oxidized derivative apparently serves as an effective weathering stabilizer and thus the compound of the present invention appear unique in effectively stabilizing the substrate for a long period of time. In addition, the compounds of the present invention posses anti-static properties and adhesion improving properties. Furthermore, they are of ready solubility in most substrates. The substrates normally subject to exposure to weather include plastics, resins, paints, other coatings, etc.

Illustrative plastics which are stabilized by the novel compounds of the present invention include polyolefins and particularly polyethylene, polypropylene, polybutylene, mixed ethylene propylene polymers, mixed ethylene butylene polymers, mixed propylene butylene polymers, etc. The solid olefin polymers are used in many applications including electrical insulation, light weight outdoor furniture, awnings, cover for greenhouses, etc. In many of these applications the solid olefin polymer is exposed to sunlight and air.

Another plastic being used commercially on a large scale is polystyrene. The polystyrene type resins are particularly useful in the manufacture of molded or machine articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyle chloride with acrylonitrile, methacrylonitrile, vinylidine chloride, alkyl acrylate, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc. Here again, deterioration occurs due to ultraviolet light and oxidation.

Still other plastics are prepared from other monomers and are available commercially. Illustrative examples of such other solid polymers include phenolformaldehyde resins, urea-formaldehyde resins, malamine-formaldehyde resins, acryloid plastics which are derived from methyl, ethyl and higher alkyl acrylates and methacrylates as monomers used in the polymerization. Also included as the solid polymers are the polyurethane foams which are becoming increasingly available on a large scale and polyacetals, especially polyformaldehydes such as "Delrin" and "Celcon." Still other resins are the epoxy resins which also are used outdoors and undergo deterioration due to ultraviolet light and oxidation. Other substrates include vinyl, urethane, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers therewith polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. As hereinbefore set forth, still other substrates include paints, varnishes, drying oils, pigments, rust preventitive coatings, wax coatings, protective coating, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, resins, paints, etc., which normally are not exposed outdoors.

The compounds of the present invention also are of utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, dispersion of sediment when formed, preventing and/or retarding discoloration, rust or corrosion inhibitor, detergent, etc.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6 - ditertiarybutyl - 4-methylphenol. Other inhibitors which may be used generally will be of the phenolic or amine type and include phenyl-alpha-naphthylamine, phenyl-beta-naphthylamine, phenothiazine, Nonox WSP, Nonox Cl, dialkylated phenols, trialkylated phenols including 2,4-dimethyl-6-tertiarybutylphenol, etc., Santonox R, Santowhite, alkylalkoxyphenols, 2246 and 425 (American Cyanamid), diphenyl-p-phenylenediamine, 1,1,3 - tris - (2-methyl-4-hydroxy-5-t-butylphenyl)-butane, 703 (Ethyl Corporation), Salol (salicylic acid esters), p-octyl-phenylsalicylate, various phosgene alkylated phenol reaction products, various alkoxyalkyldihydroxybenzophenones, polyalkyldihydroxybenzophenones, tetrahydroxybenzophenones, 2,4,5-trihydroxybutyrophenone, etc. Other ultraviolet light stabilizers include nickel - bis - dithiocarbamates, nickel-bis-dihydroxypolyalkylphenol sulfides, dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc. The additional inhibitor generally will be used in a concentration of from about 1% to about 75% by weight of the compound of the present invention.

The additive of the present invention will be used in a stabilizing concentration which will depend upon the particular substrate. The additive may be used in a concentration as low as 0.001% to about 25% but generally will be used in a concentration of from about 0.01% to about 5% by weight of the substrate. The additive is incorporated in the substrate in any suitable manner. For example, when it is incorporated into a plastic, resin or the like, it may be added to the hot melt with stirring, generally in a Banbury mixer, extruder or other device. When it is added to a liquid, it is incorporated into the liquid with intimate stirring. When it is added to a multi-component mixture as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, decalin, etc.

The following examples are introduced to illustrate further the novelty and utility of the present invention but not with the intention of unduly limiting the same.

*Example I*

The compound of this example is N,N'-di-sec-octyl-N-(2-hydroxyethyl)-aminoethylethanolamine [also can be named N,N'-di-sec-octyl-N,N'-di-(2-hydroxyethyl)-ethylenediamine] and was prepared by reacting N,N'-bis-(1-methylheptyl)-ethylenediamine with two mole proportions of ethylene oxide. The oxyethylation was effected by intimately mixing the reactants in a turbomixer at a temperature of about 240° F. and a pressure of about 250 p.s.i. for about two hours. The product was recovered as a liquid boiling at 188° C. at 0.4 mm. Hg and having an index of refraction $n_D^{20}$ of 1.4705, basic nitrogen content of 5.37 meq./g., hydroxyl content of 4.5 meq./g. and a G.L.C. purity of 98%.

*Example II*

The additive of this example is N,N-bis-[N-sec-octyl-N-(2-hydroxyethyl) - aminoethyl] - ethanolamine, which also may be named $N^1,N^3$-di-sec-octyl-$N^1,N^2,N^3$-tri-(2-hydroxyethyl) - diethylenetriamine. The compound was prepared by reacting one mole proportion of $N^1,N^3$-bis-(1-ethyl - 3 - methylpentyl)-diethylenetriamine with three mole proportions of ethylene oxide in a turbomixer at a temperature of about 212° F. for four hours. The product was recovered as a light colored liquid boiling at 233–235° C. at 0.5 mm. Hg having a basic nitrogen content of 6.58 meq./g. and a hydroxyl content by acetylation method of 5.75 meq./g.

*Example III*

The compound of this example is N,N-bis-[N-sec-pentatriacontyl - N - (2 - hydroxyethyl)-aminoethyl]-ethanolamine. This compound also may be named $N^1,N^3$-di-sec-pentatriacontyl-$N^1,N^2,N^3$ - tri - (2-hydroxyethyl)-diethylenetriamine. It was prepared by first reductively alkylating one mole proportion of diethylenetriamine with two mole proportions of pentatriacontanone to prepare $N^1,N^3$-di-pentatriacontyl-diethylenetriamine. 108 g. (0.1 mole) of $N^1,N^3$ - di-pentatriacontyl - diethylenetriamine then were reacted with 25 g. (0.4 mole) of ethylene oxide at 212° F. for seven and one-half hours. N,N-bis-[N-pentatriacontyl - N - (2-hydroxyethyl)-aminoethyl]-ethanolamine was recovered as a solid having an equivalent weight of 463 which corresponds to the theoretical equivalent weight of 405.

*Example IV*

As hereinbefore set forth, the compound of the present invention is advantageously utilized in conjunction with an additional additive. A homogeneous mixture was prepared by dissolving 7.5 parts by weight of 2,6-ditertiarybutyl-4-methylphenol in 100 parts by weight of N,N'-di-sec-octyl-N-hydroxyethyl-aminoethylethanolamine. The butylated hydroxytoluene was readily soluble in the N,N'-di-sec-octyl-N-hydroxyethyl-aminoethylethanolamine and resulted in a homogeneous solution.

*Example V*

The compound of this example is $N^1,N^4$-di-sec-decyl-$N^1,N^2,N^3,N^4$-tetra-(3-hydroxypropyl) - tripropylenetetraamine and is prepared by first reductively alkylating tripropylenetetraamine with methyl octyl ketone and then reacting the resultant $N^1,N^4$-di-sec-decyl-tripropylenetetraamine with propylene oxide at 215° F. for about 4 hours. After the reaction is completed and the reaction mixture is cooled to room temperature, $N^1,N^4$-di-sec-decyl-$N^1,N^2,N^3,N^4$-tetra-(3-hydroxypropyl) - tripropylenetetraamine is recovered from the reaction mixture.

*Example VI*

The compound of this example is N,N'-dicyclohexyl-N-(2-hydroxyethyl)-aminoethylethanolamine [also can be named N,N'-dicyclohexyl-N,N'-di-(2-hydroxyethyl)-ethylenediamine] and is prepared by reacting N,N'-dicyclohexylethylenediamine with 2 mole proportions of ethylene oxide. The oxyethylation is effected by intimately mixing the reactants in a turbomixer at a temperature of about 250° F. and a pressure of about 300 p.s.i. for about 3 hours.

*Example VII*

As hereinbefore set forth, the compound of the present invention is of exceptional utility as an additive in plastics. The plastic of this example is polyethylene. The polyethylene was a special batch of commercial polyethylene and was obtained free of inhibitors in order that it may be used as a proper control sample to evaluate the effect of the inhibitor. The solid polyethylene is of the high density type and the inhibited product is marketed commercially under the trade name of Fortiflex by the Celanese Corporation of America. The polyethylene was milled in a two-roll heated mill of conventional commercial design and the inhibitor was incorporated in the sample during the milling. The samples were pressed into sheets of about 17 mil thickness and cut into plaques of about 1⅜" x 1½". The plaques were exposed to weathering on an outdoor rack facing south and inclined at a 45° angle at Des Plaines, Ill. The samples were analyzed periodically by infrared analysis and the intensity of the carbonyl band at 1715 cm.$^{-1}$ was determined and reported as "carbonyl number." The higher intensity of the carbonyl band indicates a higher carbonyl concentration (expressed as carbonyl number) and accordingly increased deterioration.

Deterioration of the polyolefin exposed outdoors increases rapidly during the late spring, summer and early fall months. A sample of the polyethylene without inhibitor, when exposed outdoors in about the middle of May, underwent an increase in carbonyl number to above 720 by the end of August. Another sample of the same polyethylene without the inhibitor, when placed outdoors in the beginning of January, increased in carbonyl number from an initial of about 25 to about 90 by the beginning of May and then shot up to over 500 by the middle of July.

The inhibitor of this example is the mixture of N,N'-di-sec-octyl-N-hydroxyethyl-aminoethylethanolamine and butylated hydroxytoluene described in Example IV. The mixture was incorporated in the polyethylene described above in a concentration of 1.075% by weight. The sample was placed outdoors at the end of April and, when evaluated in the manner described above, the carbonyl number increased from an initial of 20 to only about 48 by the middle of August and to only 71 after 352 days. Accordingly, in almost a year, the carbonyl number increase was very low. This sample has been exposed outdoors for a total of 526 days and the carbonyl number has increased to only 114 after this long period of exposure. After 847 days of outdoor exposure, the carbonyl number has increased to only 147. No brittleness, crazing or cracking has been observed at this time of exposure.

Example VIII

The compound of Example II also was evaluated as an additive in the polyethylene in the same manner as described in Example VII. One percent by weight of N,N-bis-[N-sec-octyl - N - (2 - hydroxyethyl)-aminoethyl] ethanolamine, prepared as described in Example II, and 0.075% by weight of butylated hydroxytoluene were incorporated in another sample of the polyethylene described in Example VII. The polyethylene was evaluated by outdoor exposure in the same manner as heretofore described. The sample was placed outdoors at the end of April and the carbonyl number increased from an initial of 32 to only 95 by the middle of September and to only 112 after 352 days (almost a year) of outdoor exposure. After 526 days the carbonyl number was only 180. Here again, no darkening, brittleness, crazing or cracking has been noticed.

Example IX

The compound of Example III also was evaluated in another sample of the polyethylene described in Example VII. One percent by weight of N,N-bis-[N-sec-pentatriacontyl - N - (2-hydroxyethyl)-aminoethyl]-ethanolamine, prepared as described in Example III, was incorporated in another sample of the polyethylene and exposed outdoors in the same manner as described in Example VII. The sample was placed outdoors at the end of November and after 514 days (about one and one-half years) the carbonyl number increased from an initial of 91 to only 241. Here again, the sample was white throughout the full exposure. This is another demonstration of the effectiveness of the additive to inhibit deterioration of the polyethylene without imparting undesired discoloration thereto.

Example X

Evaluations of the polyethylene described in Example VII also were made in a Weather-Ometer. The Weather-Ometer was operated without the use of water sprays. The samples of polyethylene were prepared in substantially the same manner as described in Example VII and the plaques were inserted into plastic holders, affixed onto a rotating drum and exposed to carbon arc rays at about 125° F. in the Weather-Ometer. Here again, the samples were examined periodically by infrared analysis to determine the carbonyl band at 1715 cm.$^{-1}$.

A sample of the polyethylene without inhibitor, when evaluated in the Weather-Ometer, increased from a carbonyl number of 28 to 855 within 624 hours. In contrast, another sample of the polyethylene containing 1% by weight of N,N'-di-sec-octyl-N-hydroxyethyl-aminoethylethanolamine, prepared as described in Example I, and 0.075% by weight of butylated hydroxytoluene developed a carbonyl number of only 250 after 1392 hours. Here again, the sample remained white throughout the complete evaluation.

Example XI

Evaluations in the Weather-Ometer also were made using another sample of the polyethylene described in Example VII and containing 1% by weight of N,N-bis-[N-sec-octyl - N - (2-hydroxyethyl)-aminoethyl]-ethanolamine, prepared as described in Example II, and 0.075% by weight of butylated hydroxytoluene.

When evaluated in the Weather-Ometer in the same manner as described in Example X, the polyethylene increased from an initial carbonyl number of 32 to only 254 after 1392 hours. The sample remained white throughout the complete evaluation. Here again, the effectiveness of the inhibitor of the present invention is demonstrated.

Example XII

N,N' - di-sec-octyl-N-hydroxyethyl - aminoethylethanolamine, prepared as described in Example I, is used as an additive in polystyrene. The additive is added in a concentration of 1.5% by weight to styrene and then the mixture is polymerized by heating at a temperature of about 250° F. for seven days. The resulting resin is molded at a temperature of about 320° F. into plates. The effect of the inhibitor is determined by exposing outdoors three plates containing the additive and three plates of polystyrene prepared in the same manner but not containing the additive. After exposure outdoors for a period of one hour, the samples of polystyrene without additive undergoes discoloration and deterioration. In contrast, the samples of polystyrene containing the additive will undergo substantially no deterioration and will be substantially unchanged in color.

Example XIII

The compound of Example I is used in a concentration of 0.001% by weight as an additive in burner oil. The burner oil is evaluated in a method referred to as the Erdco Test. In this method, heated oil is passed through a filter, and the time required to develop a differential pressure across the filter of 25 in. Hg is determined. It is apparent that the longer the time, the more effective is the additive. However, with a very effective additive, the time to reach a differential pressure across the filter of 25 in. Hg is lengthened beyond reasonable limits that the test is stopped after about 300 minutes and the differential pressure at that time is reported. A control sample of the burner oil (not containing an additive) developed a differential pressure across the filter of 25 in. Hg in about 125 minutes. In contrast, the sample of burner oil containing the additive of this example will develop a differential pressure across the filter of less than 1 in. Hg after 300 minutes.

Example XIV

As hereinbefore set forth, it is essential that the alkyl groups attached to the nitrogen atoms must be of secondary alkyl configuration and must contain at least 6 carbon atoms each. This is illustrated in the present example which compares runs made in the stabilization of solid propylene. The polypropylene used in these runs was an uninhibited commercial polypropylene and the evaluations were made in a Weather-Ometer in substantially the same manner as described in Example IX.

A control sample (not containing an additive) of the polypropylene increased in carbonyl number from 140 to over 1000 within 192 hours.

A sample of the polypropylene containing 1% by weight of N,N' - di - normal - octyl-N-(2-hydroxyethyl) aminoethylethanolamine and 0.15% by weight of butylated hydroxytoluene developed a carbonyl number of greater than 1000 within 864 hours.

A sample of the polypropylene containing 1% by weight of N,N'-di-sec-octyl-N-(2-hydroxyethyl)-aminoethylethanolamine and 0.15% by weight of butylated hydroxytoluene did not develop a carbonyl number of greater than 1000 until 1152 hours.

From a comparison of the above data, it will be seen that the configuration of the alkyl group is important. The normal alkyl derivative failed within 864 hours in contrast to the 1152 hours stability obtained with the secondary alkyl derivative.

In addition to the importance of the configuration of the alkyl group, the length of the alkyl group also is critical. This is illustrated by the following data which were obtained in the same manner as described above.

A sample of the polypropylene containing 1% by weight of N,N'-di-sec-butyl - N - (2-hydroxyethyl)-aminoethylethanolamine and 0.15% of butylated hydroxytoluene, when evaluated in the same manner, developed a carbonyl number of greater than 1000 in 768 hours. It will be noted that the N,N'-di-sec-octyl derivative did not develop a carbonyl number of greater than 1000 until 1152 hours.

The above data demonstrate the criticality of both the secondary alkyl configuration and of the necessity that the sec-alkyl groups contain at least 6 carbon atoms.

I claim as my invention:

1. The compound of the following formula

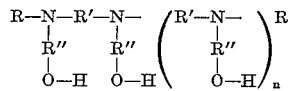

where R is a sec-alkyl group of from 6 to about 50 carbon atoms or a cycloalkyl group, R' is an alkylene group of from 2 to about 6 carbon atoms, R" is an alkylene group of from 2 to about 6 carbon atoms and $n$ is an integer of from 0 to 4.

2. The compound of claim 1 being N,N'-di-sec-alkyl-N-(hydroxyalkyl)-aminoalkylalkanolamine in which each sec-alkyl contains from 6 to about 50 carbon atoms.

3. The compound of claim 2 being N,N'-di-sec-octyl-N-(2-hydroxyethyl)-aminoethylethanolamine.

4. The compound of claim 2 being N,N'-di-sec-pentatriacontyl-N-(2-hydroxyethyl)-aminoethylethanolamine.

5. The compound of claim 1 being N,N-bis-[N-sec-alkyl-N-(hydroxyalkyl) - aminoalkyl] - alkanolamine in which each sec-alkyl contains from 6 to about 50 carbon atoms.

6. The compound of claim 5 being N,N-bis-[N-sec-octyl-N-(2-hydroxyethyl)-aminoethyl]-ethanolamine.

7. The compound of claim 5 being N,N-bis-[N-sec-pentatriacontyl - N - (2 - hydroxyethyl) - aminoethyl] ethanolamine.

8. The compound of claim 1 being N,N'-di-cycloalkyl-N-(hydroxyalkyl)-aminoalkylalkanolamine.

9. The compound of claim 8 being N,N'-dicyclohexyl-N-(2-hydroxyethyl)-aminoethylethanolamine.

10. The compound of claim 1 being N,N-bis-[N-cycloalkyl-N-(hydroxyalkyl)-aminoalkyl]-alkanolamine.

No references cited.

CHARLES B. PARKER, *Primary Examiner.*

P. C. IVES, *Assistant Examiner.*